United States Patent [19]

Chatterji et al.

[11] Patent Number: 5,713,416
[45] Date of Patent: Feb. 3, 1998

[54] METHODS OF DECOMPOSING GAS HYDRATES

[75] Inventors: Jiten Chatterji; James E. Griffith, both of Duncan, Okla.

[73] Assignee: Halliburton Energy Services, Inc., Duncan, Okla.

[21] Appl. No.: 720,825

[22] Filed: Oct. 2, 1996

[51] Int. Cl.$^6$ .............. E21B 43/24; E21B 43/26
[52] U.S. Cl. .......... 166/263; 166/300; 166/303; 166/308; 166/312; 166/371; 423/580.1; 585/15
[58] Field of Search .................. 166/263, 300, 166/302, 303, 307, 308, 312, 371, 901; 423/580.1; 585/15

[56] References Cited

U.S. PATENT DOCUMENTS

| | | | |
|---|---|---|---|
| 3,103,973 | 9/1963 | Mullen | 166/300 X |
| 3,388,744 | 6/1968 | Fincher et al. | 166/303 |
| 3,930,539 | 1/1976 | Curtis | 166/300 |
| 4,424,866 | 1/1984 | McGuire | 166/303 |
| 4,856,593 | 8/1989 | Matthews et al. | 166/371 X |
| 4,915,176 | 4/1990 | Sugier et al. | 166/371 |
| 5,076,364 | 12/1991 | Hale et al. | 166/371 X |

OTHER PUBLICATIONS

Donald L. Katz, "Depths to Which Frozen Gas Fields (Gas Hydrates) May Be Expected," Journal of Petroleum Technology, pp. 419–423, Apr., 1971.

G.D. Holder, P.F. Angert, V.T. John and S. Yen, "A Thermodynamic Evaluation of Thermal Recovery of Gas From Hydrates in the Earth," Journal of Petroleum Technology, pp. 1127–1132, May, 1982.

T.S. Collett and C.A. Ehlig–Economides, "Detection and Evaluation of the In–Situ Natural Gas Hydrates in the North Slope Region, Alaska," SPE Paper No. 11673, presented at the 1983 California Regional Meeting held in Ventura, California, Mar. 23–25, 1983.

K.A. Kvenvolden, "Gas Hydrates at Two Sites of an Active Continental Margin," SPE Paper No. 13592, presented at the SPE 1985 California Regional Meeting held in Bakersfield, California, Mar. 27–29, 1985.

Vidyadhar A. Kamath and Sanjay P. Godbole, "Evaluation of Hot–Brine Stimulation Technique for Gas Production From Natural Gas Hydrates," Journal of Petroleum Technology, pp. 1379–1388, Nov., 1987.

S.P. Godbole, V.A. Kamath and C. Ehlig–Economides, "Natural Gas Hydrates in the Alaskan Arctic," SPE Formation Evaluation, pp. 263–266, Mar., 1988.

D.T. Lai and A.K. Dzialowski, "Investigation of Natural Gas Hydrates in Various Drilling Fluids," SPE/IADC Paper No. 18637, prepared for presentation at the 1989 SPE/IADC Drilling Conference held in New Orleans, Louisiana, Feb. 28–Mar. 3, 1989.

Arthur H. Hale and Ashok K.R. Dewan, "Inhibition of Gas Hydrates in Deepwater Drilling," SPE Drilling Engineering, pp. 109–115, Jun., 1990.

T.S. Kotkoskie, B. Al–Ubaidi, T.R. Wildeman and E.D. Sloan, "Inhibition of Gas Hydrates in Water–Based Drilling Muds," SPE Paper No. 20437, prepared for presentation at the 65th Annual Technical Conference and Exhibition of the Society of Petroleum Engineers held in New Orleans, Louisiana, Sep. 23–26, 1990.

J–C. Iseux, "Gas Hydrates: Occurrence, Production and Economics," SPE Paper No. 21682, prepared for presentation at the Production Operations Symposium held in Oklahoma City, Oklahoma, Apr. 7–9, 1991.

M.R. Islam, "A New Recovery Technique for Gas Production From Alaskan Gas Hydrates," SPE Paper No. 22924, prepared for presentation at the 66th Annual Technical Conference and Exhibition of the Society of Petroleum Engineers held in Dallas, Texas, Oct. 6–9, 1991.

R.B. Grigg and G.L. Lynes, "Oil–Based Drilling Mud as a Gas–Hydrates Inhibitor," SPE Drilling Engineering, pp. 32–38, Mar. 1992.

*Primary Examiner*—George A. Suchfield
*Attorney, Agent, or Firm*—Robert A. Kent; Dougherty & Hessin

[57] ABSTRACT

The present invention provides methods of decomposing gas hydrates in subsea or subterranean wells, the equipment associated with the wells and in subterranean reservoirs containing gas hydrates. The methods basically comprise the steps of combining an acidic liquid with a basic liquid which chemically react exothermically to form a hot salt solution, contacting the gas hydrates with the hot salt solution to decompose at least a portion of the gas hydrates whereby natural gas and water are released therefrom and recovering the released natural gas, water and salt solution.

36 Claims, No Drawings

METHODS OF DECOMPOSING GAS HYDRATES

BACKGROUND OF THE INVENTION

1. Field of the Invention

The present invention provides improved methods of decomposing gas hydrates in subsea and subterranean wells and formations.

2. Description of the Prior Art

Gas hydrates are ice-like crystalline compounds composed of water and natural gas which are stable under particular conditions of low temperature and high pressure. Large quantities of natural gas are often trapped in small volumes of gas hydrates. That is, when a standard cubic foot of natural gas is defined as the space occupied by one cubic foot of gas at atmospheric pressure and 60° F., gas hydrates contain from about 170 to about 180 standard cubic feet of natural gas per cubic foot of hydrate. Hydrates are relatively immobile and impermeable and must be disassociated into natural gas and water in order to release and recover the natural gas.

Large quantities of natural gas in the form of gas hydrate deposits exist in many regions of the world. The deposits generally exist in suboceanic sediments as well as cold regions. For example, a very large amount of natural gas is trapped in gas hydrate form in the North Slope of Alaska. Recently, these gas hydrates have been identified as an alternate resource for natural gas. However, gas hydrates are extremely difficult to exploit because they are immobile in subterranean formations containing them and cause the formation to be impermeable. Thus, in order to produce natural gas from gas hydrates contained in a subterranean reservoir, the gas hydrates must be disassociated in place whereby the natural gas and water making up the gas hydrates are released. Generally, little has been done to develop an economical technique capable of producing natural gas from gas hydrate reservoirs.

A number of techniques for producing natural gas from gas hydrate subterranean reservoirs have been proposed heretofore. Most of such techniques involve thermal recovery, e.g., steam injection, hot water injection, hot brine injection and fire flooding. Other proposed techniques include depressurization and the use of water solvent chemicals such as methanol or glycol. Generally, the prior techniques are slow and inefficient in recovering natural gas from gas hydrate reservoirs. The combination of thermal recovery with depressurization is more attractive, but heretofore it also has proved to be relatively inefficient and uneconomical.

In steam injection and fire flooding, heat losses can be severe and the generation and injection of steam is very costly. Fire flooding can cause dilution of the natural gas produced which in turn reduces its energy value. Hot water injection yields lower heat losses than steam injection, but the presence of permafrost and high reservoir pressure generally make thermal recovery techniques inadequate.

In depressurization techniques, formation pressure reduction causes the destabilization of gas hydrates and their disassociation. As the hydrates disassociate, they absorb heat from the surrounding formation. The rate of the disassociation of the hydrates, however, is controlled by the rate of heat transfer from the formation which is normally slow.

The combination of thermal recovery and depressurization, i.e., producing natural gas from gas hydrates by thermal stimulation followed by depressurization, would be attractive if an efficient and economical thermal hydrate decomposition technique could be utilized. Thus, there is a need for an improved and economical thermal gas hydrate decomposition technique.

In offshore deep water drilling operations, the formation of gas hydrates during drilling are often a problem. That is, when drilling operations are conducted in deep water where the water temperature near the sea bed is close to the freezing point of water, e.g., 38° F., gas hydrates readily form. Gas hydrates also form in shallow water and onshore wells where both natural gas and produced water are present in the wells. The problems experienced in drilling operations include the formation of gas hydrate plugs between the drill string and the blow out preventer, plugging at or below the blow out preventer, plugging in choke and kill lines and the like.

Heretofore, various attempts have been made to decompose gas hydrate plugs in wells utilizing solvents such as alcohols, glycols and the like. Generally, such attempts have been inadequate. In offshore drilling operations it has often been necessary to disconnect the blow out preventer and lift it to the surface for gas hydrate removal. In deep water drilling operations, a stack disconnect and reconnect costs about $1,000,000.00 and at least four days of drilling down time.

Thus, there is a need for improved methods of decomposing gas hydrates formed in subsea or subterranean wells or in the equipment associated therewith.

SUMMARY OF THE INVENTION

The present invention provides improved methods of decomposing gas hydrates and releasing natural gas and water therefrom which meet the needs described above and overcome the deficiencies of the prior art. The methods of the present invention basically include the steps of combining an acidic liquid with a basic liquid which chemically react exothermically to form a hot salt solution, and contacting gas hydrates with the hot salt solution to thereby thermally decompose the gas hydrates and release natural gas and water therefrom.

The methods of the present invention for recovering natural gas from a subterranean formation containing gas hydrates penetrated by a well bore are basically comprised of the steps of combining an acidic liquid with a basic liquid which chemically exothermically react to form a hot salt solution, introducing the hot salt solution into the formation to thereby contact and decompose a portion of the gas hydrates therein whereby natural gas and water are released therefrom, and then producing the released natural gas, water and spent salt solution from the formation thereby depressurizing the formation and decomposing additional gas hydrates therein.

The methods of the present invention for decomposing gas hydrates formed in a subsea or subterranean well or in the equipment associated with the well connected to the surface by tubular goods basically comprises the steps of combining an acidic liquid with a basic liquid which chemically exothermically react to form a hot salt solution, and then introducing the hot salt solution into the well or equipment by way of the tubular goods connected thereto so that the hot salt solution contacts and decomposes the gas hydrates.

It is, therefore, a general object of the present invention to provide improved methods of thermally decomposing gas hydrates and releasing natural gas and water therefrom.

Other and further objects, features and advantages of the present invention will be readily apparent to those skilled in the art upon a reading of the description of preferred embodiments which follows.

DESCRIPTION OF PREFERRED EMBODIMENTS

As mentioned above, large quantities of natural gas in the form of gas hydrate deposits exists in many regions including the North Slope of Alaska. However, gas hydrates contained in subterranean reservoirs are extremely difficult to produce in that they are solid, immobile and make a subterranean formation containing them impermeable. In order to produce natural gas from gas hydrates contained in a subterranean formation or reservoir, the gas hydrates must be decomposed in place whereby the natural gas and water making them up are released.

In the drilling and production of subsea and subterranean wells, gas hydrates often form in the wells or in the equipment associated therewith. The presence of the solid, immobile and impermeable hydrates often prevents the continuation of drilling or production operations making the removal of the hydrates mandatory. Prior attempts to remove the hydrates by dissolving them in solvents and the like have generally been unsuccessful.

In accordance with the methods of the present invention, gas hydrates in subsea or subterranean formations or reservoirs as well as gas hydrates which form in wells during drilling and production operations are economically thermally decomposed whereby they are converted to natural gas and water.

The methods of this invention for thermally decomposing gas hydrates and converting them to natural gas and water basically comprise the steps of combining an acidic liquid with a basic liquid which chemically exothermically react to form a hot salt solution, and contacting the gas hydrates with the hot salt solution. The heating of the gas hydrates by the hot salt solution causes the gas hydrates to disassociate and convert into natural gas and water. The contact with the salt solution also reduces the equilibrium disassociation temperature of the gas hydrates which lowers the heat required for the decomposition of the hydrates.

The methods of the present invention are particularly suitable for recovering natural gas from a subterranean formation or reservoir containing gas hydrates penetrated by a well bore. In carrying out the methods, an acidic liquid is combined with a basic liquid which chemically exothermically react to form a hot salt solution. The hot salt solution is introduced into the formation or reservoir containing gas hydrates to thereby contact and decompose a portion of the hydrates in the reservoir whereby natural gas and water are released therefrom. The released natural gas and water and the spent salt solution are produced from the formation or reservoir thereby depressurizing the formation or reservoir and causing additional gas hydrates to decompose which are also produced. When required, additional acidic and basic liquids are combined and the hot salt solution formed is introduced into the formation or reservoir to further decompose gas hydrates therein.

The methods of this invention are also suitable for decomposing gas hydrates formed in subsea or subterranean wells or in the equipment associated therewith. That is, acidic and basic liquids are combined to form a hot salt solution and the hot salt solution is introduced and spotted in the well or the equipment containing gas hydrates so that it contacts the hydrates and causes them to decompose. The term "equipment" is used herein to mean tubular goods, tools and parts disposed in or connected to wells such as drill pipe, tubing, casing, subsea conductor pipes, subsea stacks, blow out preventors, choke lines, kill lines and the like.

As will be understood by those skilled in the art, the acidic and basic liquids can be separately flowed to a location adjacent to a formation or reservoir containing gas hydrates or adjacent to the location in a well or the equipment associated therewith having gas hydrates formed therein prior to combining the liquids. The liquids are then combined and reacted in the adjacent location just prior to contacting gas hydrates with the hot salt solution formed to thereby prevent unnecessary heat loss. This technique is particularly useful in decomposing gas hydrates contained in subsea or subterranean formations or reservoirs where the water or earth through which the liquids are flowed is very cold, e.g., deep water offshore wells or onshore wells drilled through permafrost.

While any liquid containing an acid or acid precursor and any liquid containing a base or base precursor can be utilized in accordance with the present invention so long as they chemically react exothermically when combined, aqueous acid solutions and basic liquids comprising liquid ammonia and aqueous base solutions are preferred. Of the various aqueous acid solutions that can be used, aqueous acid solutions containing an acid selected from the group consisting of hydrochloric acid, sulfuric acid, nitric acid, phosphoric acid and mixtures of such acids are particularly preferred. When such an aqueous acid solution is utilized, the acid is preferably present therein in an amount in the range of from about 4% to about 30% by weight of the solution.

Of the various basic liquids which can be utilized, liquid ammonia and aqueous solutions of ammonium hydroxide, sodium hydroxide, potassium hydroxide or mixtures thereof are particularly preferred. When such an aqueous base solution is utilized, the base is preferably present therein in an amount in the range of from about 2% to about 28% by weight of the solution.

The most preferred acidic and basic liquids for use in accordance with this invention are an aqueous hydrochloric acid solution containing hydrochloric acid in an amount in the range of from about 4% to about 30% by weight of the solution and liquid ammonia.

The water used to form an aqueous acid solution or an aqueous base solution for use in accordance with this invention can be any water which does not adversely react with the acid or base or otherwise inhibit the reaction of the acid and base or the formation of a hot salt solution. For example, the water can be fresh water, brackish water, salt water, brine or the like.

The particular quantities of acidic liquid and basic liquid utilized in carrying out the methods of this invention are those quantities which react exothermically to form a salt solution having a desired temperature. Generally, the quantities are such that when the acidic and basic liquids are combined, the temperature of the reacted hot salt solution formed is in the range of from about 10° F. to about 140° F. at atmospheric temperature and pressure. When the reactants and the resulting reacted hot salt solution are confined under higher temperature and/or pressure conditions, the temperature of the reacted hot salt solution can range from about 10° F. to about 250° F.

In performing the methods of the present invention, the acidic and basic liquids are prepared separately on the surface using conventional mixing equipment. Depending upon the particular application in which gas hydrates are to be decomposed, the acidic and basic liquids are pumped by separate pumps and combined on-the-fly on the surface before being injected into tubular goods, or they are pumped separately through the tubular goods to a location close to the gas hydrates to be decomposed wherein they are combined. For example, in shallow wells either offshore or onshore where heat losses to water or subterranean earth formations are relatively small, the acidic and basic liquids can be combined on-the-fly on the surface and mixed and reacted while flowing to the location of the gas hydrates to be decomposed. In cold deep water offshore wells or subterranean wells drilled through permafrost, the acidic and basic liquids can be pumped separately to a location near the gas hydrates before being combined and allowed to react.

This can be accomplished by pumping one of the liquids through tubing disposed in the well bore while pumping the other liquid through the annulus between the tubing and casing or the walls of the well bore. This process physically separates the liquids while pumping them past heat sinks, and then allows the liquids to mix and exothermically react just prior to contacting the hydrates.

As will be understood, the distance and time between the location where the acidic and basic liquids are combined and the location of the gas hydrates to be contacted must be long enough for the acidic and basic liquids to react and reach the temperature required to bring about the decomposition of the gas hydrates, but not so long that disadvantageous heat losses occur.

In the recovery of natural gas from a subsea or subterranean formation or reservoir containing gas hydrates, the hot salt solution formed by the exothermic reaction between the acidic and basic liquids is introduced into the formation or reservoir into contact with gas hydrates contained therein whereby the gas hydrates are thermally decomposed and natural gas and water are released therefrom. As mentioned previously, the gas hydrates are decomposed as a result of being heated to their decomposition temperature in combination with the lowering of that temperature due to contact between the gas hydrates and the aqueous salt solution. Upon the decomposition of a portion of the gas hydrates in the formation or reservoir, the released natural gas and water as well as the spent salt solution are produced from the formation or reservoir which lowers the pressure in the formation or reservoir. This depressurization shifts the equilibrium and brings about additional decomposition of gas hydrates contained in the formation or reservoir. When an equilibrium condition is again reached in the formation or reservoir, the above described process of thermally decomposing gas hydrates and depressurizing the formation or reservoir is repeated.

In carrying out the methods of recovering natural gas from hydrates in subsea or subterranean formations or reservoirs, the acidic and basic liquids are preferably pumped at rates and pressures whereby the hot salt solution formed is displaced into the formation or reservoir at a rate and pressure sufficient to fracture the formation or the gas hydrates in the reservoir whereby the hot salt solution penetrates deeply into the formation or reservoir.

In performing the methods of the present invention for decomposing gas hydrates formed in a subsea or subterranean well or in the equipment associated therewith, the hot salt solution formed by combining the acidic and basic liquids is introduced into the well and spotted to the location of the hydrates whereby the hydrates are decomposed. After the hydrates are decomposed, the natural gas and water released and the salt solution are circulated or produced out of the well.

As will be understood, a variety of additives can be included in the acidic and basic liquids such as metal corrosion inhibiting additives, fracture propping agents, viscosifying agents, fluid loss additives, friction reducing additives and the like.

In order to further illustrate the methods of the present invention, the following example is given.

EXAMPLE

A well drilled through 1,000 feet of permafrost and penetrating a gas hydrate reservoir at 3,500 feet is treated and produced in accordance with the method of this invention. The temperature and pressure of the reservoir are 35° F. and 2500 psig.

A quantity of 1,000 gallons of an aqueous hydrochloric acid solution containing 24% by weight hydrochloric acid is prepared and stored on the surface. A quantity of 150 gallons of liquid ammonia is also provided at the surface. The hydrochloric acid solution and the liquid ammonia at temperatures of 40° F. are separately pumped into tubular goods disposed in the well bore to a location at a depth of 3,200 feet where they are combined and reacted exothermically to produce a hot ammonium chloride salt solution containing 32% by weight salt and 3% to 5% by weight residual acid having a temperature of 250° F. The hot salt solution is displaced into the gas hydrate containing reservoir at a rate of 15 barrels per minute and a pressure of 5,000 psig whereby the reservoir is fractured and the hot salt solution is flowed deeply into the reservoir. Once the hot salt solution has been displaced into the fractured reservoir, the pumping is terminated and the reservoir is reverse flowed. The natural gas and water released as a result of the decomposition of gas hydrates as well as the spent salt solution are produced out of the formation. This production results in a lowering of the formation pressure by a differential amount of about 500 psig thereby decomposing additional gas hydrates. As a result of the thermal decomposition of the gas hydrates and the subsequent decomposition of gas hydrates due to depressurization, natural gas at an average rate of 250,000 standard cubic feet per day per foot of treated interval is produced.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of decomposing gas hydrates and releasing natural gas and water therefrom comprising the steps of:

combining a liquid comprising an acid with a liquid comprising a base which chemically react exothermically to form a hot salt solution; and contacting said gas hydrates with said hot salt solution.

2. The method of claim 1 wherein said liquid comprising an acid is an aqueous acid solution.

3. The method of claim 2 wherein said acid is selected from the group consisting of hydrochloric acid, sulfuric acid, nitric acid, phosphoric acid and mixtures thereof.

4. The method of claim 3 wherein said acid is present in said aqueous acid solution in an amount in the range of from about 4% to about 30% by weight of said solution.

5. The method of claim 1 wherein said liquid comprising a base is selected from the group consisting of liquid ammonia and an aqueous base solution.

6. The method of claim 5 wherein said base is an aqueous base solution selected from the group consisting of solutions containing ammonium hydroxide, solutions containing sodium hydroxide, solutions containing potassium hydroxide and solutions containing mixtures of the foregoing bases.

7. The method of claim 6 wherein said base is present in said aqueous base solution in an amount in the range of from about 2% to about 28% by weight of said solution.

8. The method of claim 1 wherein when said liquid comprising an acid and said liquid comprising a base are combined, they are present in amounts such that the temperature of the hot salt solution formed is in the range of from about 10° F. to about 250° F.

9. A method of recovering natural gas from a subterranean formation containing gas hydrates penetrated by a well bore comprising the steps of:
  (a) combining a liquid comprising an acid with a liquid comprising a base which chemically react exothermically to form a hot salt solution;
  (b) introducing said hot salt solution into said formation to thereby contact and decompose a portion of said gas hydrates therein whereby natural gas and water are released therefrom; and
  (c) producing said released natural gas, water and salt solution from said formation thereby depressurizing said formation and decomposing additional gas hydrates therein.

10. The method of claim 9 wherein said hot salt solution is introduced into said formation in accordance with step (b) at a rate and pressure sufficient to fracture said formation.

11. The method of claim 9 wherein said hot salt solution is introduced into said formation in accordance with step (b) by pumping said liquid comprising an acid and liquid comprising a base through said well bore wherein they are combined and react in accordance with step (a) to form said hot salt solution which is displaced into said formation.

12. The method of claim 9 wherein said liquid comprising an acid is an aqueous acid solution.

13. The method of claim 12 wherein said acid is selected from the group consisting of hydrochloric acid, sulfuric acid, nitric acid, phosphoric acid and mixtures thereof.

14. The method of claim 13 wherein said acid is present in said aqueous acid solution in an amount in the range of from about 4% to about 30% by weight of said solution.

15. The method of claim 9 wherein said liquid comprising a base is selected from the group consisting of liquid ammonia and an aqueous base solution.

16. The method of claim 15 wherein said base is an aqueous base solution selected from the group consisting of solutions containing ammonium hydroxide, solutions containing sodium hydroxide, solutions containing potassium hydroxide and solutions containing mixtures of the foregoing bases.

17. The method of claim 16 wherein said base is present in said aqueous base solution in an amount in the range of from about 2% to about 28% by weight of said solution.

18. The method of claim 9 wherein when said liquid comprising an acid and said liquid comprising a base are combined in accordance with step (a), they are present in amounts such that the temperature of the hot salt solution formed is in the range of from about 10° F. to about 250° F.

19. A method of recovering natural gas from a subterranean formation containing gas hydrates penetrated by a well bore comprising the steps of:
  (a) combining an aqueous hydrochloric acid solution with liquid ammonia to form a hot ammonium chloride salt solution;
  (b) introducing said hot salt solution into said formation to thereby contact and decompose a portion of said gas hydrates therein whereby natural gas and water are released therefrom; and
  (c) producing said released natural gas, water and salt solution from said formation thereby depressurizing said formation and decomposing additional gas hydrates therein.

20. The method of claim 19 wherein said hot salt solution is introduced into said formation in accordance with step (b) at a rate and pressure sufficient to fracture said formation.

21. The method of claim 19 wherein said hot salt solution is introduced into said formation in accordance with step (b) by pumping said liquid comprising an acid and liquid comprising a base through said well bore wherein they are combined and react in accordance with step (a) to form said hot salt solution which is displaced into said formation.

22. The method of claim 21 wherein said hydrochloric acid is present in said aqueous hydrochloric acid solution in an amount in the range of from about 4% to about 30% by weight of said solution.

23. The method of claim 22 wherein when said aqueous hydrochloric acid solution and said liquid ammonia are combined in accordance with step (a), they are present in amounts such that the temperature of the hot salt solution formed is in the range of from about 10° F. to about 250° F.

24. A method of decomposing gas hydrates formed in a subsea or subterranean well or in the equipment associated therewith comprising the steps of:
  combining a liquid comprising an acid with a liquid comprising a base which chemically react exothermically to form a hot salt solution; and
  introducing said hot salt solution into said well or equipment by way of said tubular goods connected thereto so that it contacts and decomposes said gas hydrates.

25. The method of claim 24 wherein said hot salt solution is introduced into said well or equipment by pumping said liquid comprising an acid and liquid comprising a base through said tubular goods wherein they are combined and reacted to form said hot salt solution which is displaced into said well or equipment.

26. The method of claim 25 wherein said liquid comprising an acid and said liquid comprising a base are pumped separately through said tubular goods to a location therein adjacent to the connection of said tubular goods to aid well or equipment.

27. The method of claim 24 wherein said liquid comprising an acid is an aqueous acid solution.

28. The method of claim 27 wherein said acid is selected from the group consisting of hydrochloric acid, sulfuric acid, nitric acid, phosphoric acid and mixtures thereof.

29. The method of claim 28 wherein said acid is present in said aqueous acid solution in an amount in the range of from about 4% to about 30% by weight of said solution.

30. The method of claim 24 wherein said liquid comprising a base is selected from the group consisting of liquid ammonia and an aqueous base solution.

31. The method of claim 30 wherein said base is an aqueous base solution selected from the group consisting of solutions containing ammonium hydroxide, solutions containing sodium hydroxide, solutions containing potassium hydroxide and solutions containing mixtures of the foregoing bases.

32. The method of claim 31 wherein said base is present in said aqueous base solution in an amount in the range of from about 2% to about 28% by weight of said solution.

33. The method of claim 24 wherein when said liquid comprising an acid and said liquid comprising a base are combined, they are present in amounts such that the temperature of the hot salt solution formed is in the range of from about 10° F. to about 250° F.

34. The method of claim 33 wherein said liquid comprising an acid is an aqueous hydrochloric acid solution and said liquid comprising a base is liquid ammonia.

35. The method of claim 34 wherein said hydrochloric acid is present in said aqueous hydrochloric acid solution in an amount in the range of from about 4% to about 30% by weight of said solution.

36. The method of claim 35 wherein when said aqueous hydrochloric acid solution and said liquid ammonia are combined, they are present in amounts such that the temperature of the hot salt solution formed is in the range of from about 10° F. to about 250° F.

* * * * *